: US006514891B1

United States Patent
Lee

(10) Patent No.: US 6,514,891 B1
(45) Date of Patent: Feb. 4, 2003

(54) THICK DIELECTRIC COMPOSITION FOR SOLID STATE DISPLAY

(75) Inventor: Yoon Kwan Lee, Kwangmyoung (KR)

(73) Assignee: LG Electronics Inc., Seoul (KR)

( * ) Notice: Subject to any disclaimer, the term of this patent is extended or adjusted under 35 U.S.C. 154(b) by 72 days.

(21) Appl. No.: 09/612,916

(22) Filed: Jul. 10, 2000

(30) Foreign Application Priority Data

Jul. 14, 1999 (KR) .............................................. 99-28580
Jul. 19, 1999 (KR) .............................................. 99-29145

(51) Int. Cl.$^7$ .............................. C03C 4/16; C03C 8/20; C03C 3/16
(52) U.S. Cl. .............................. 501/32; 501/15; 501/17; 501/45; 501/47; 501/48
(58) Field of Search .............................. 501/15, 17, 32, 501/45, 47, 48, 134

(56) References Cited

U.S. PATENT DOCUMENTS

| | | | |
|---|---|---|---|
| 4,997,795 A | * | 3/1991 | Hang et al. .................... 501/24 |
| 5,093,291 A | * | 3/1992 | Kawabata et al. ........... 501/134 |
| 5,098,869 A | * | 3/1992 | Morimoto et al. ............. 501/32 |
| 5,246,890 A | * | 9/1993 | Aitken et al. .................. 501/15 |
| 5,403,788 A | * | 4/1995 | Nishida et al. ................ 501/32 |
| 5,714,840 A | * | 2/1998 | Tanabe et al. ............... 313/581 |
| 6,174,829 B1 | * | 1/2001 | Jean et al. ...................... 501/32 |
| 6,184,163 B1 | * | 2/2001 | Lee et al. ....................... 501/32 |
| 6,194,333 B1 | * | 2/2001 | Ryu ............................... 501/32 |
| 6,287,995 B1 | * | 9/2001 | Lee ............................... 501/15 |
| 6,376,398 B1 | * | 4/2002 | Lee et al. ....................... 501/32 |
| 6,383,961 B1 | * | 5/2002 | Ryu ............................... 501/32 |

* cited by examiner

Primary Examiner—Karl Group
(74) Attorney, Agent, or Firm—Fleshner & Kim, LLP

(57) ABSTRACT

The present invention related to a dielectric composition of a solid state display. The dielectric composition can be $P_2O_5$—ZnO-BaO glass, $SiO_2$—ZnO-$Ba_2O_3$ glass of PbO—ZnO—$B_2O_3$ glass, and an oxide filler with a binary compound including $PbTiO_3$ or a ternary compound including $PbTiO_3$ and $PbZrO_3$.

7 Claims, 7 Drawing Sheets

THICK DIELECTRIC COMPOSITION FOR SOLID STATE DISPLAY

BACKGROUND OF THE INVENTION

1. Field of the Invention

The present invention relates to a thick dielectric composition for a solid state display (SSD) and a method for fabricating the solid state display, and more particularly, to a composition whose thermal and electrical characteristics are improved and having a high permittivity and dielectric property, which is used for thick dielectrics of a solid state display, and a method for fabricating the solid state display by forming thick dielectrics on a rear substrate using the composition and thereafter simultaneously pressurizing and heating the same.

2. Description of the Background Art

Typical flat panel displays are generally classified into liquid crystal displays (LCD), field emission displays (FED), plasma display panels (PDP) and electroluminescence (EL) and so on.

Among the above-mentioned flat panel displays, the electroluminescence (EL) are active displays using the luminescence of a semiconductive fluorescent material by applying an electric field to the above fluorescent material applied to a glass substrate or transparent organic film, which are divided into thin film electroluminescent devices (TFEL) for displaying information in orange yellow, dispersion type electroluminescent devices (EL), and solid state displays (SSD).

Herein, the above solid state displays (SDD) are improvements on the above thin film electroluminescent devices (TFEL), and the derivation principle thereof will now be described in detail.

Generally, in an electroluminescent device, a rear electrode, first insulating layer, fluorescent layer, second insulating layer, and transparent electrode are stacked on a predetermined substrate one after another. When a voltage is applied between the rear electrode and the transparent electrode, visible rays are outputted from the fluorescent layer. At this time, the transparent layer is surrounded by an insulating material, which makes the fluorescent layer not broken down by an electric filed inputted from the areas excepting the fluorescent layer. That is, the insulating film formed on the fluorescent layer by the insulating material makes it possible to stably apply a high voltage to the fluorescent layer, and prevents impurities and moisture from penetrating into the fluorescent layer from outside.

However, in the thin film electroluminescent device whose insulating layer is relatively thin, the dielectric breakdown property is high, the reproducibility of a thin film insulating layer is reduced, and the fabrication process is complicated, due to an electric filed inputted from outside. Consequently, the problems of the thin film electroluminescent device have been solved, and a thick dielectric EL (TDEL) or solid state display device (SSD) having a good luminescence property have been developed.

FIG. 1 is a block diagram of a general solid state display device (SSD), in which a rear substrate 1 made of a predetermined material, a rear electrode 2 formed on the rear substrate 1, a thick dielectric layer 3 formed on the rear electrode 2 for preventing dielectric breakdown, a fluorescent layer 5 formed on the thick fluorescent layer 3 for generating visible rays, a thin dielectric layer 6 formed on the fluorescent layer 5, a transparent electrode 2 formed on the thin dielectric layer are staked one after another. In addition, a planarization layer 4 for flattening the interface between the thick dielectric layer 3 and the fluorescent layer 5 is further stacked between the thick dielectric layer 3 and the fluorescent layer 5.

Each of the layers constructing the structure of the above SSD will now be described in more detail.

The rear substrate 1 is generally made of an alumina material containing 96% aluminum oxide ($Al_2O_3$) because it must be sintered at a high temperature, and the rear electrode 2 is made of a conductive metallic material such as aluminum (Al) at a thickness of about 10 $\mu$m being formed by vacuum deposition or screen printing method.

On the rear electrode 2, a dielectric material with a high permittivity is thickly formed, and thereby the thick dielectric layer 3 is stacked, in order to maintain a high dielectric breakdown property and a low driving voltage. Namely, the thick dielectric layer 3 is generally in the Perovskite crystal structure, and is formed by applying a paste powder mixture having a diameter of 2~3 $\mu$m, which is mixed $SrTiO_3$, $PbTiO_3$, and $BaTiO_3$ powder with an organic solvent, at a thickness of 50~200 $\mu$m, and then baking the same at a temperature of 900~1000° C. under oxidation atmosphere. Herein, in order to prevent the dielectric breakdown of the fluorescent layer 5, there must be no pinholes, the thick dielectric layer 3 must be strongly attached to the fluorescent layer 5, and the dielectric loss factor (tan $\delta$) must be low.

On the thick dielectric layer 3, a fluorescent material is deposited at a thickness of 0.5~2 $\mu$m using vacuum deposition method to form a fluorescent layer 5.

Herein, the fluorescent layer is made of ZnS:Sm material for emitting red visible rays, ZnS:Tb material for emitting green visible rays, and $CaGa_2S_4$:Ce material for emitting blue visible rays.

On the fluorescent layer 5, a thin dielectric layer 6 with a thickness of 1~3 $\mu$m is formed, coated with Indium Tin Oxide (ITO) with a thickness of 0.5 $\mu$m, and then baked for about one hour at a temperature of 450~500° C. to form a transparent electrode 7.

Meanwhile, a planarization layer 4 is formed between the thick dielectric layer 3 and the fluorescent material 5 by applying PZT (lead zirconium titanate) with a thickness of a number of $\mu$m using Sol-Gel or MOD (Metal Organic Decomposition) method, in order to smooth the surface of the thick dielectric layer 3.

The thusly formed SSD is sealed with a low melting glass or silicon sealant at a thickness of 10~20 $\mu$m so that it is not contaminated by impurities or moisture from outside, thus becoming a finished product.

The driving principle of the thusly constructed SSD will now be described in brief.

First of all, when a predetermined voltage (e.g., 22V) is applied to the rear electrode 1 and the transparent electrode 7 electrons are emitted at the interface level of the thick dielectric layer 3 and the thin dielectric layer 6 adjacent to the fluorescent layer 5 by means of tunneling effect. The emitted electrons are accelerated by a high electric field (e.g., $10^6$V/m) to become thermal electrons, said thermal electrons collide with atoms contained in the fluorescent material (e.g., ZnS:Mn) and thereby excite these atoms, said excited atoms emit visible rays while transiting to the ground state. With this principle, the solid state display displays desired images. At this time, the thick dielectric layer 3 serves to prevent dielectric breakdown and the diffusion between the rear electrode 2 and the fluorescent layer 5, stably supply a high voltage, and keep the solid state display's own thermal stability.

Meanwhile, the method for fabricating a SSD will now be described.

(a) A rear electrode 2 of a predetermined shape is formed on a rear substrate 1 using an electrode printer. At this time, the rear electrode 2 is made of a conductive metal.

(b) A thick dielectric layer 3 is formed on the rear electrode 2 using screen printing method. At this time, the thick dielectric layer 3 has a thickness of preferably 100~300 μm, and is made of $SrTiO_3$, $PbTiO_3$, and $BaTiO_3$. As described above, the thick dielectric layer 3 formed at a predetermined thickness is baked at a temperature of 900~1000° C. under oxidation atmosphere. Thus, the rear substrate 1 is made of aluminum oxide ($Al_2O_3$) capable of bearing a high baking temperature.

(c) A planarization layer 4 with a thickness of 2~3 μm is formed on the thick dielectric layer 3 using Sol-Gel, screen printing, or spin coating method. At this time, the planarization layer 4 is made of a material such as PZT (Lead Zirconium Titanate)

(d) A fluorescent layer 5 with a predetermined thickness is formed on the planarization layer 4 using vacuum deposition method. At this time, the fluorescent layer 5 is made mainly of ZnS:Mn.

(e) A thin dielectric layer 6 with a thickness of 1~2 μm is formed on the fluorescent layer 5 using vacuum deposition method.

(f) A transparent electrode 7 is formed on the thin dielectric layer 5 using vacuum deposition method. At this time, the transparent electrode 7 is made of Indium-Tin Oxide (ITO) which is a transparent material through which visible rays can be transmitted.

The solid state display device thusly fabricated must have the following characteristics in general.

Firstly, in order to reduce the driving voltage, the dielectric constant must be more than 1000.

Second, in order to keep a stability of the interface between the fluorescent layer and the dielectric layer, the dielectric strength must be more than $1.0 \times 10^6$ V/m.

Thirdly, in order to keep a stability of the interface between the fluorescent layer and the dielectric layer, the surface roughness of the dielectric layer must be high.

Fourthly, in order to maintain a high dielectric strength, the amount of air bubbles must be minimized inside the dielectric layer, in the interface between the fluorescent layer and the dielectric layer, and in the interface between the electrode and the dielectric layer.

However, since the conventional solid state display is coated with thick dielectric and thereafter is baked at a high temperature of more than 1000° C., a rear substrate capable of bearing the above temperature has to be used. Therefore, the material of the rear substrate used for the conventional solid state display is restricted to materials having a high melting point such as alumina.

In addition, since the conventional solid state display is baked at a high temperature, the electrode is damaged, pinholes are occurred due to impurities contained in vacuum, air bubbles are incompletely removed from the dielectrics and the interface thereof and thus the dielectric loss factor is increased, whereby the dielectric breakdown property is reduced and the adherence between the dielectric layer and the fluorescent layer is also reduced.

SUMMARY OF THE INVENTION

Accordingly, it is an object of the present invention to provide a thick dielectric composition for a solid state display whose thermal or electrical characteristics are improved.

It is another object of the present invention to provide a method for fabricating a solid state display in which the occurrence of pinholes due to impurities and the occurrence of air bubbles in the interface of dielectrics are restrained, and the adherence between the layers constructing the solid state display is increased, thus improving the dielectric breakdown property.

To achieve the above objects, in a thick dielectric composition for preventing dielectric breakdown of a solid state display, there is provided a first composition of a thick dielectric layer in accordance with the present invention which includes a $P_2O_5$—ZnO—BaO type glass, an oxide filler, and an organic solvent.

In a thick dielectric composition for preventing breakdown of a solid state display, there is provided a second composition of a thick dielectric layer in accordance with the present invention which includes a $SiO_2$—ZnO—$Ba_2O_3$ type glass, an oxide filler, and an organic solvent.

In a thick dielectric composition for preventing breakdown of a solid state display, there is provided a third composition of a thick dielectric layer in accordance with the present invention which includes a PbO—ZnO—$B_2O_3$ type glass, an oxide filler, and an organic solvent.

A method for fabricating a solid state display in accordance with the present invention includes a step of forming a metal electrode on a predetermined substrate, and a step of forming thick dielectrics in green sheet or paste on the substrate having the above metal electrode and thereafter simultaneously heating and pressurizing the above thick dielectrics.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

Figure 1:
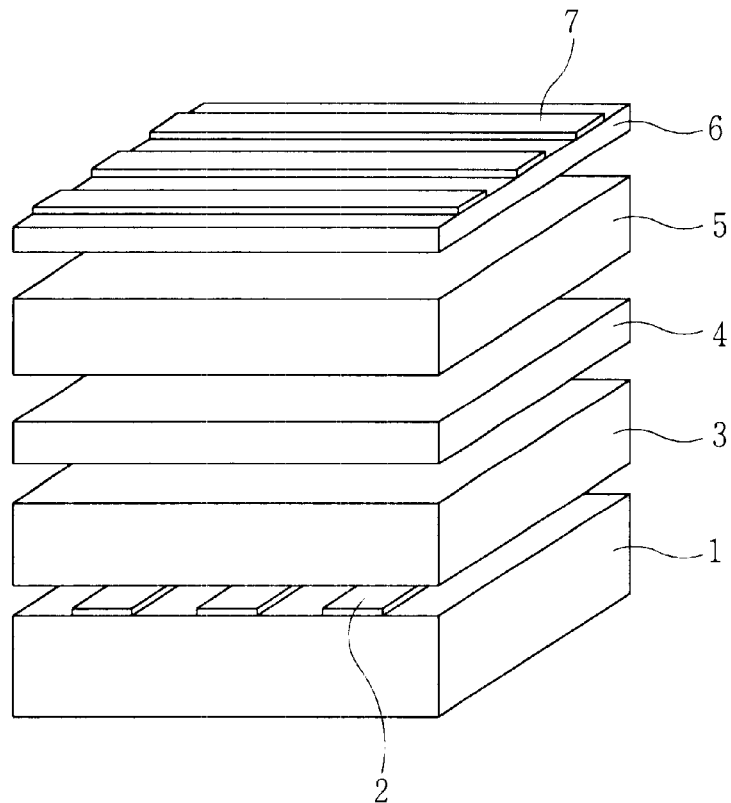
FIG. 1 is a block diagram of a general solid state display.

A thick dielectric composition for a solid state display and a method for fabricating the solid state display in accordance with the present invention will now be described.

First Embodiment

The first embodiment of a thick dielectric composition for a solid state display in accordance with the present invention includes a $P_2O_5$—ZnO—BaO type main glass powder and oxide filler, each of which will now be described in more detail.

1-1) Firstly, the $P_2O_5$—ZnO—BaO type main glass powder is composed of components in the composition ratio as described in Table 1. The composition ratio of the components as described in Table 1 is represented in percentage after calculating the weight of each component contained in the main glass powder, when the main glass powder is 100% by weight.

TABLE 1

Composition ratio of $P_2O_5$—ZnO—BaO type main glass powder

| component | $P_2O_5$ | ZnO | BaO | $LiO_2$ | $B_2O_3$ | $Al_2O_3$ | CaO | $K_2O$ | $Na_2O$ |
|---|---|---|---|---|---|---|---|---|---|
| Weight (%) | 40~60 | 20~40 | 3~15 | 2~10 | 1~10 | 1~7 | 1~6 | 0~5 | 0~5 |

Herein, the main component of the above $P_2O_5$—ZnO—BaO type main glass powder is $P_2O_5$, in which P ions have a high ion field strength (e.g., 43.2). Thus, in order to maintain the electroneutrality, phase separation has to be occurred under an unstable structure in which one P—O bond is double bonded. Therefore, the $P_2O_5$—ZnO—BaO type main glass powder is easily crystallized, and has a high permittivity. In addition, the $P_2O_5$—ZnO—BaO type main glass powder is formed to have a very proper surface roughness because the amount of air bubbles generated during baking is small, whereby the generation and injection of electrons is stably achieved in the interfaces. In addition, the transition point of the $P_2O_5$—ZnO—BaO type main glass powder is less than 500° C., and the baking temperature thereof can be reduced to less than 700° C. when thick dielectrics are baked. Thus, a glass substrate can be used, besides an $Al_2O_3$ substrate which is only used at a high temperature. Subsequently, a wide variety of materials can be used for fabricating a rear substrate of the solid state display, whereby the fabrication cost of the solid state display can be reduced.

1-2) Meanwhile, the oxide filler added to the main glass powder in order to increase the permittivity and the dielectric property includes a binary compound of which main component is $PbTiO_3$ and a ternary compound of which main component is $PbTiO_3+PbZrO_3$, each of which including the following compounds as described in Table 2.

TABLE 2

| Oxide filler | |
|---|---|
| Binary compound | Ternary compound |
| $PbTiO_3 + PbZrO_3$ | $PbTiO_3 + PbZrO_3 + Pb(X_{1/3}Nb_{2/3})O_3$ |
| $PbTiO_3 + Pb(X_{1/3}Nb_{2/3})O_3$ | $PbTiO_3 + PbZrO_3 + Pb(X_{1/2}Nb_{1/2})O_3$ |
| $PbTiO_3 + Pb(X_{1/2}Nb_{1/2})O_3$ | $PbTiO_3 + PbZrO_3 + Pb(X_{1/2}W_{1/2})O_3$ |
| $PbTiO_3 + Pb(X_{1/2}W_{1/2})O_3$ | $PbTiO_3 + PbZrO_3 + Pb(X_{1/2}Te_{1/2})O_3$ |
| $PbTiO_3 + Pb(X_{1/2}Te_{1/2})O_3$ | $PbTiO_3 + PbZrO_3 + Pb(X_{1/3}Sb_{2/3})O_3$ |
| $PbTiO_3 + Pb(X_{1/3}Sb_{2/3})O_3$ | |

In Table 2, X corresponds to one of Mg, Co, Zn, Dd, Mn, Ni, Sb, and Y.

Among the above binary compounds having $PbTiO_3$ as a main component, $PbTiO_3+PbZrO_3$ is a ferrolelectric material having a permittivity of more than 1000 and a dielectric strength of more than $10^6$V/m. Particularly, Zr ions and Ti ions have a similar radius and their outer electrons are arranged in a similar manner, so the electrical characteristics and material characteristics are stable. Herein, the $PbZrO_3$ serves to prevent the over-growth of crystals and keep the structure compact, whereby the strength of the thick dielectrics is increased.

In addition, in the same manner as the $PbTiO_3+PbZrO_3$, the binary compounds such as $PbTiO_3+Pb(X_{1/3}Nb_{2/3})O_3$, $PbTiO_3+Pb(X_{1/2}Nb_{1/2})O_3$, $PbTiO_3+Pb(X_{1/2}W_{1/2})O_3$, $PbTiO_3+Pb(X_{1/2}Te_{1/2})O_3$, and $PbTiO_3+Pb(X_{1/3}Sb_{2/3})O_3$ have a high permittivity and withstand voltage, so they provide excellent characteristics as oxide filler.

Meanwhile, the ternary compounds having $PbTiO_3+PbZrO_3$ as a main component as illustrated in Table 2 are properly mixed with main glass powder and prevent PbO from being evaporated during baking, thus making the dielectric property and the withstand voltage property stable. That is, the oxide filler'own permittivity ranges from 3000~4000, and the permittivity of thick dielectrics during the formation of thick dielectrics is more than 20000, whereby the driving voltage of the solid state display can be effectively reduced.

Particularly, the ternary compounds help PbO not to be evaporated during the baking of the thick dielectrics, so the occurrence of air bubbles can be reduced. Thus, the thick dielectric layer containing the oxide filler is closely connected to the fluorescent layer because it has a compact structure. In addition, when defects are occurred, the characteristics of the open mode are appeared for thereby maximizing the life span of the solid state display.

Figure 2:
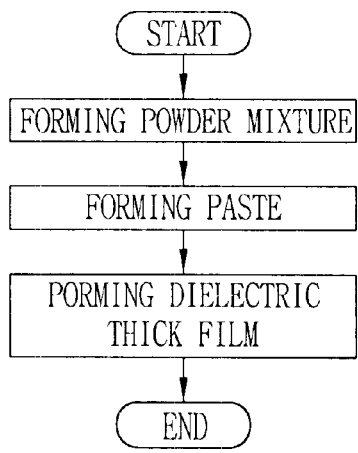
FIG. 2 is a flow chart illustrating a method for forming a thick dielectric layer of a solid state display in accordance with the present invention.

FIG. 2 is a flow chart illustrating a method for forming a thick dielectric layer of a solid state display in accordance with the present invention.

(a) Main glass powder is mixed with oxide filler powder in a predetermined ratio to form a powder mixture in STI. The process of forming the powder mixture will now be described in more detail.

(a-1) In a first step, the raw materials of $P_2O_5$—ZnO—BaO type main glass is weighed according to the composition ratio of Table 1, and then are mixed at a tumbling mixer for a predetermined time (for instance, 10 hours).

(a-2) In a second step, the mixed raw materials are melted at a melting furnace. The mixed raw materials are melted at a temperature of 1100° C. for about five hours, and are stirred two or three times so that they are uniformly melted to thus be homogenized, whereby the powder mixture is changed into melted glass to make the structure of the glass compact.

(a-3) In a third step, the melted glass is quickly cooled to form a powder having fine particles. That is, the melted glass is changed into cullets having fine cracks when it is quickly cooled after passing through a quenching roller. When the cullets are milled for a predetermined time (e.g., 16 hours) using ball milling, and then are sequentially passed through No. 170 and No. 270 sivers, the particles of the cullets are turned into powder having a particle size distribution of about 6xx m.

(a-4) Accordingly, the thusly generated $P_2O_5$—ZnO—BaO type main glass powder and the oxide filler as described in Table 2 are mixed to form a powder mixture. That is, the main glass powder is weighed according to a predetermined composition ratio as described in Table 1, and then is mixed with the binary compounds or ternary compounds at the tumbling mixer for a predetermined time (e.g., 10 hours) to form a powder mixture. At this time, it is preferable that 60 to 80% by weight of main glass and 20 to 40% by weight of oxide filler are mixed with each other.

(b) The powder mixture formed in (a) is mixed with an organic solvent in a predetermined ratio to form a paste in ST2. At this time, the viscosity of the paste is preferably from 50,000~150,000 cps.

(c) The paste is applied to a rear substrate having a rear electrode to form a thick dielectric layer in ST3. Using screen printing method, the paste is applied to the rear substrate at a uniform thickness, and then is baked to form a thick dielectric layer. Meanwhile, the thick dielectric layer can be fabricated in the form of green sheet according to the intention of its designer.

Subsequently, the thick dielectric layer of the solid state display generated by the steps (a) and (b) has a high permittivity and dielectric property, so the driving voltage is low and the device characteristic are made stable. In addition, the main glass which is a thick dielectric composition in accordance with the present invention has a transition point less than 500° C., and has a baking temperature less than 700° C., whereby $Al_2O_3$ material or glass material can be used, and accordingly the fabrication cost of the solid state display can be reduced. In addition, in the thusly formed thick dielectric layer, the amount of air bubbles are minimized when the thick dielectric layer is baked, thus preventing the heat distortion of the device and the deterioration of the device characteristics.

Second Embodiment

The second embodiment of a thick dielectric composition for a solid state display in accordance with the present invention includes a $SiO_2$—$ZnO$—$B_2O_3$ type main glass powder and oxide filler, each of which will now be described in more detail.

1-1) Firstly, the $SiO_2$—$ZnO$—$B_2O_3$ type main glass powder is composed of components in the composition ratio as described in Table 3. The composition ratio of the components as described in Table 3 is represented in percentage after calculating the weight of each component contained in the main glass powder, when the main glass powder is 100% by weight.

main glass powder has the characteristics of the open mode capable of delaying the progress of dielectric breakdown, whereby defects, if occurred, affects only the area in which they are occurred, thus increasing the life span of the solid state display.

2-2) Meanwhile, the oxide filler added to the main glass in order to increase the permittivity and dielectric property is the same as that described in the first embodiment.

Subsequently, the thick dielectric layer of the solid state display in accordance with the second embodiment of the present invention has a high permittivity and dielectric property as described in the first embodiment of the present invention, so the driving voltage is low and the device characteristic are made stable. In addition, the main glass which is a thick dielectric composition in accordance with the present invention has a transition point less than 500° C., and has a baking temperature less than 700° C., whereby $Al_2O_3$ material or glass material can be used, and accordingly the fabrication cost of the solid state display can be reduced. In addition, in the thusly formed thick dielectric layer, the amount of air bubbles are minimized when the thick dielectric layer is baked, thus preventing the heat distortion of the device and the deterioration of the device characteristics.

Third Embodiment

The third embodiment of a thick dielectric composition for a solid state display in accordance with the present invention includes $PbO$—$ZnO$—$B_2O_3$ type main glass powder and an oxide filler, each of which will now be described in more detail.

1-1) Firstly, the $PbO$—$ZnO$—$B_2O_3$ type main glass powder is composed of components in the composition ratio as described in Table 4. The composition ratio of

TABLE 3

| Composition ratio of $SiO_2$—$ZnO$—$B_2O_3$ type main glass powder | | | | | | | | |
|---|---|---|---|---|---|---|---|---|
| component | $SiO_2$ | $K_2O$ | $Li_2O$ | $Na_2O$ | PbO | CaO | ZnO | $B_2O_3$ | $Al_2O_3$ |
| Weight (%) | 15~30 | 2~10 | 0~5 | 2~8 | 3~30 | 1~5 | 20~40 | 10~30 | 1~8 |

Herein, the $SiO_2$—$ZnO$—$B_2O_3$ type main glass powder has a baking temperature of less than 700° C., so it has a very low transition temperature and maintains a compact interface structure. In addition, the $SiO_2$—$ZnO$—$B_2O_3$ type the components as described in Table 4 is represented in percentage after calculating the weight of each component contained in the main glass powder, when the main glass powder is 100% by weight.

TABLE 4

| | Composition ratio of PbO—ZnO—B$_2$O$_3$ type main glass powder | | | | | | | | | | |
|---|---|---|---|---|---|---|---|---|---|---|---|
| component | SiO$_2$ | K$_2$O | Li$_2$O | Na$_2$O | PbO | CaO | ZnO | B$_2$O$_3$ | Al$_2$O$_3$ | Cr$_2$O$_3$ | Fe$_2$O$_3$ |
| Weight (%) | 1~30 | 0~5 | 0~5 | 1~8 | 40~85 | 0~5 | 0~20 | 1~25 | 0~8 | 0~2 | 0~2 |

Herein, the PbO—ZnO—B$_2$O$_3$ type main glass powder has a transition point of less than 500° C., and has a baking temperature of less than 700° C., so the heat distortion of the device and the deterioration of the device characteristics are minimized.

2-2) Meanwhile, the oxide filler added to the main glass in order to increase the permittivity and dielectric property is the same as that described in the first embodiment.

Subsequently, the thick dielectric layer of the solid state display in accordance with the third embodiment of the present invention has a high permittivity and dielectric property as described in the first embodiment of the present invention, so the driving voltage is low and the device characteristic are made stable. In addition, the main glass which is a thick dielectric composition in accordance with the present invention has a transition point less than 500° C., and has a baking temperature less than 700° C., whereby Al$_2$O$_3$ or glass material can be used, and accordingly the fabrication cost of the solid state display can be reduced. In addition, in the thusly formed thick dielectric layer, the amount of air bubbles minimized when the thick dielectric layer is baked, thus preventing the heat distortion of the device and the deterioration of the device characteristics.

Figure 3:
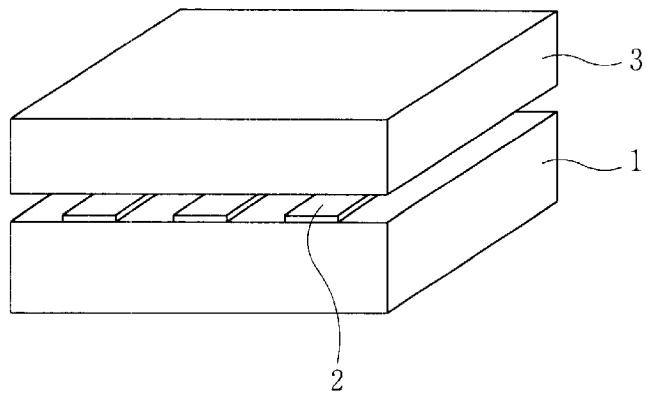
FIG. 3 is a block diagram of a solid state display in which thick dielectrics are stacked in accordance with the present invention.

FIG. 3 is a block diagram of a solid state display in which thick dielectrics are stacked in accordance with the present invention, and a method for forming a solid state display based on the thick dielectrics will now be described.

FIGS. 4A through 4E are schematic views illustrating the procedure in which a solid state display is stacked according to a method for fabricating a solid state display in accordance with a first embodiment of the present invention.

Figure 4A:
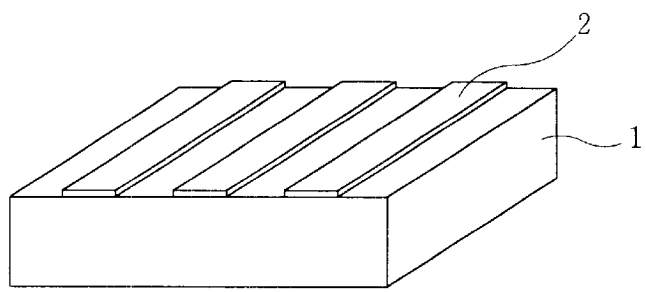
FIGS. 4A through 4E are schematic views illustrating the procedure in which a solid state display is stacked according to a method for fabricating a solid state display in accordance with a first embodiment of the present invention.
Figure 4B:
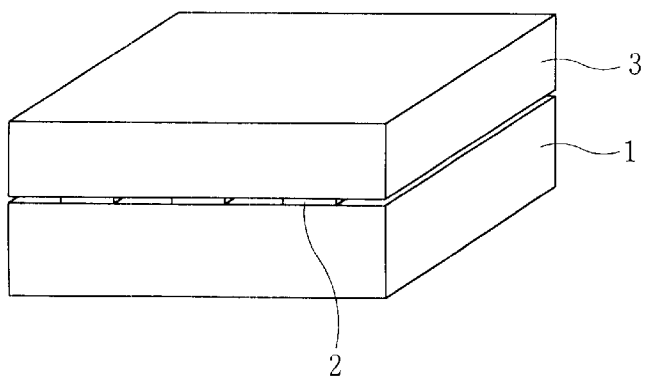

As illustrated in FIG. 4A, a rear electrode 2 made of silver (Ag) is formed on a rear substrate 1 made of glass or glass-ceramics by using screen printing method. As illustrated in FIG. 4B, dielectrics having a high dielectric breakdown property and a high permittivity in order to maintain a low driving voltage are applied on the rear substrate 1 on which the rear electrode 2 is formed, thus forming a thick dielectric layer 3.

Herein, the thick dielectric layer 3 has a Perovskite crystal structure as described in the embodiments of a thick dielectric composition, which is formed by applying a green sheet or paste with a thickness of 100~300 μm formed by mixing a main glass having a transition point of less than 500° C., oxide filler (e.g., SrTiO$_3$, PbTiO$_3$, and BaTiO$_3$ powder with a diameter of 2~3 μm) and organic solvent on the rear substrate as a thick film, and drying the same at a temperature of 120° C.

Figure 4C:
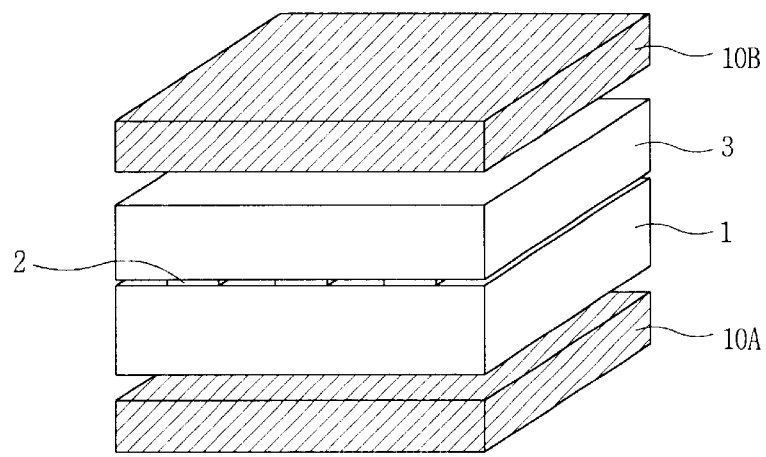

After the thick dielectric layer is formed, brass plates 10A and 10B are disposed respectively below the rear substrate 1 and above the thick dielectric layer, as illustrated in FIG. 4C. Then, a pressure of about 100~200 kg/cm$^2$ is given toward the brass plate 10B below the rear substrate 1 through the brass plate 10A above the thick dielectric layer 3. As described above, the state of pressurizing through the brass plate is achieved under oxidation atmosphere of less than 600° C.

On the other hand, the state of pressurizing through the brass plate in accordance with the conventional art is achieved at a high temperature of 1000° C.

Therefore, by the heating and pressurizing method, the thick dielectric layer 3 and the rear electrode 2 can be closely connected, and the flatness of the surface of the thick dielectric layer 3 is increased, whereby the interface between the thick dielectric layer 3 and the fluorescent layer to be formed on the thick dielectric layer 3 is made uniform, and the occurrence of pinholes are minimized, thus making it possible to maintain a high dielectric breakdown property.

Figure 4D:
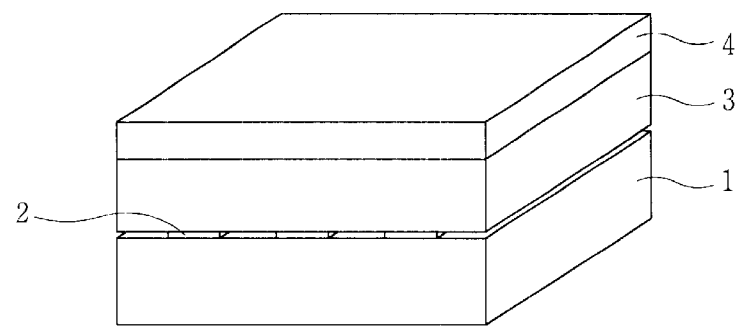
Figure 4E:
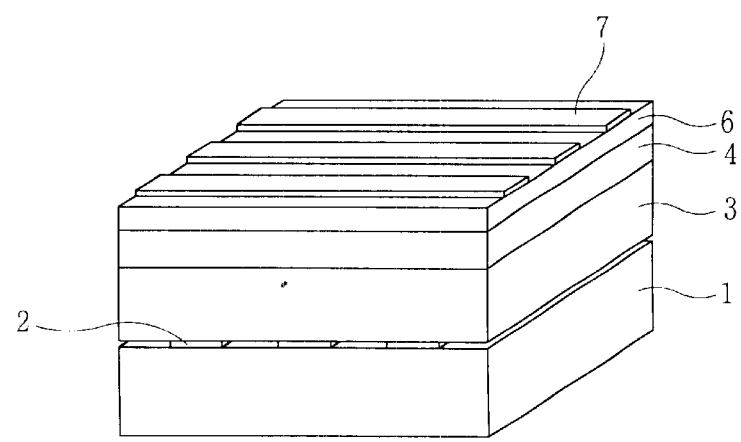

After the thick dielectric layer 3 is formed, fluorescent material is applied on the thick dielectric layer 3 at a thickness of 0.5~2μm by using vacuum deposition method to form a fluorescent layer, as illustrated in FIGS. 4D and 4E. Herein, the fluorescent layer is made of red fluorescent material of ZnS:Sm, green fluorescent material of ZnS:Tb, and blue fluorescent material of CaGa$_2$S$_4$:Ce.

After the fluorescent layer 4 is formed, a thin dielectric layer 6 and a transparent electrode 7 are formed on the fluorescent layer 4 by using vacuum deposition method as illustrated in FIG. 4E, and then are baked at a temperature of 450~500° C. for about one hour, whereby a solid state display is fabricated.

FIGS. 5A through 5E are schematic views illustrating the procedure in which a solid state display is stacked according to a method for fabricating a solid state display in accordance with a second embodiment of the present invention.

Figure 5A:
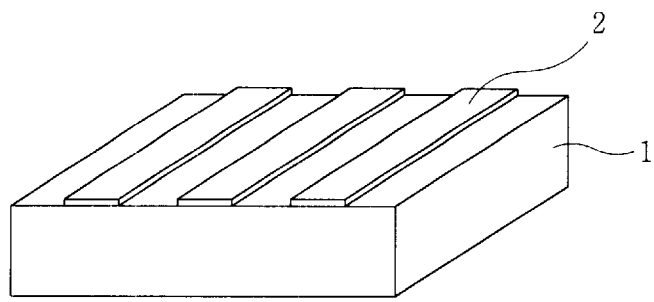
FIGS. 5A through 5E are schematic views illustrating the procedure in which a solid state display is stacked according to a method for fabricating a solid state display in accordance with a second embodiment of the present invention.
Figure 5B:
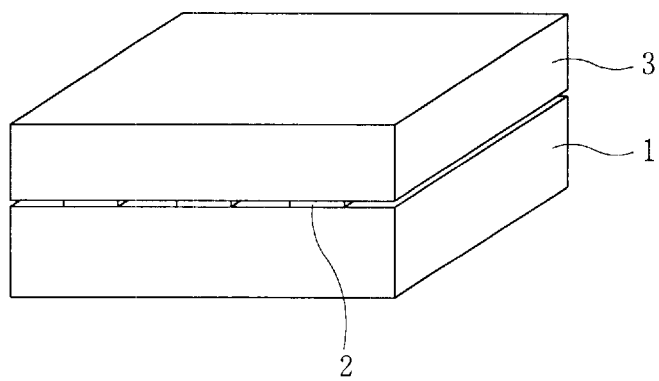

In FIGS. 5A and 5B, a rear electrode 3 and a thick dielectric layer are formed on a rear substrate 1, as in FIGS. 4A and 4B. Here, the thick dielectric layer is the same as that in FIGS. 4A through 4E.

Figure 5C:
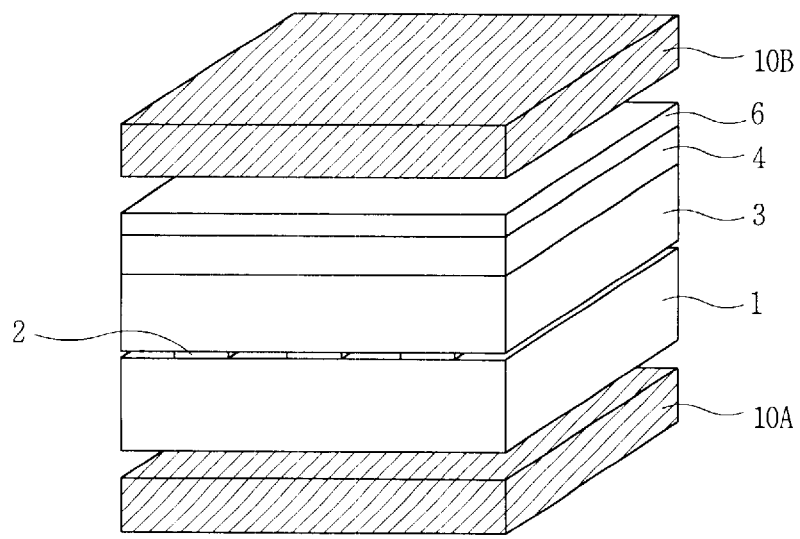

After the thick dielectric layer 3 is formed, fluorescent material is applied on the thick dielectric layer 3 at a thickness of 0.5~2 μm by using vacuum deposition method to form a fluorescent layer, as illustrated in FIG. 5C. Herein, the fluorescent layer is made of red fluorescent material of ZnS:Sm, green fluorescent material of ZnS:Tb, and blue fluorescent material of CaGa$_2$S$_4$:Ce. In addition, after the fluorescent layer 4 is formed, a thin dielectric layer 6 in a green sheet or paste is formed at a thickness of 2~5 μm.

Figure 5D:
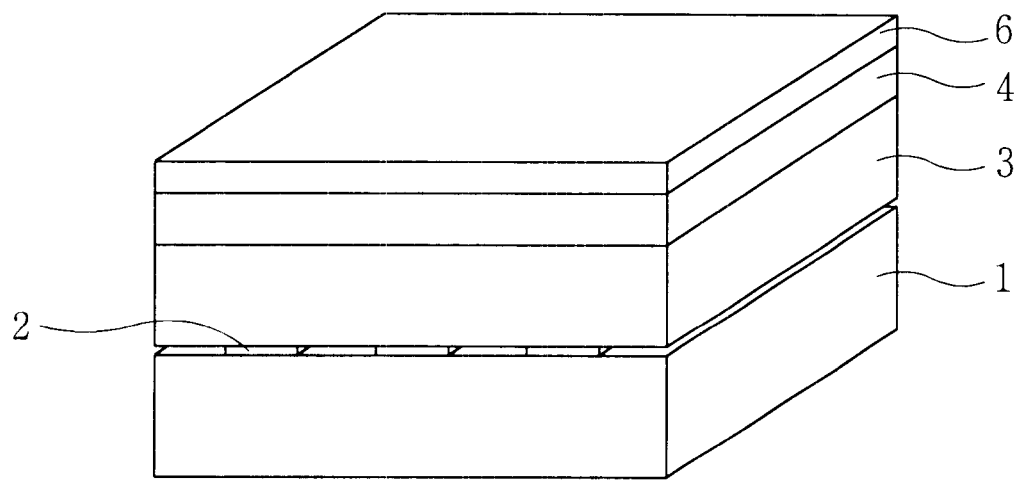

Thereafter, as illustrated in FIG. 5D, a pressure of about 100~200 kg/cm$^2$ is applied below the rear substrate 1 and above the thin dielectric layer 6 at a baking temperature of less than 600° C. by using the brass plates 10A and 10B. At this time, the fluorescent material is heated and pressurized after the thick dielectric layer 3 is formed, thus keeping the interface between the fluorescent material and the thick dielectrics more compact and minimizing the occurrence of pinholes in the thick dielectrics.

Accordingly, the dielectric breakdown strength of the thick dielectric layer 3 is increased, and the luminescence property due to an uniform electric field is improved. In addition, the thick dielectric layer 3, fluorescent layer 4, and thin dielectric layer 6 are all heated and pressurized at the same time, for thereby making the fabrication process simple, increasing the productivity, and reducing the costs.

Figure 5E:
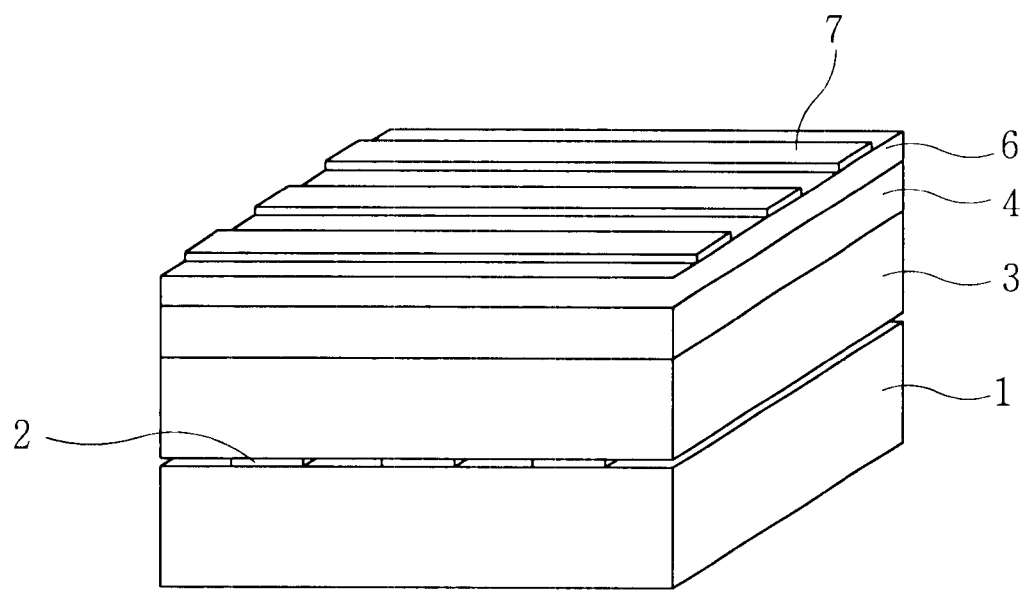

As illustrated in FIG. 5E, the solid state display is fabricated by forming a transparent electrode 7 on the thin dielectric layer 6 of the solid state display which is heated and pressurized.

FIGS. 6A through 6E are schematic views illustrating the procedure in which a solid state display is stacked according to a method for fabricating a solid state display in accordance with a third embodiment of the present invention.

Figure 6A:
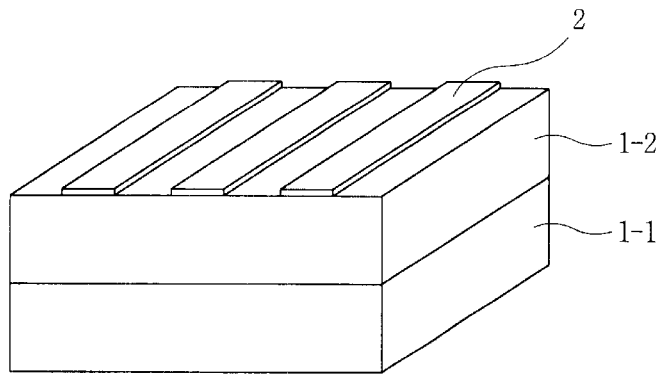
FIGS. 6A through 6E are schematic views illustrating the procedure in which a solid state display is stacked according to a method for fabricating a solid state display in accordance with a third embodiment of the present invention.

As illustrated in FIG. 6A, an insulating film 1-2 made of materials such as a low melting glass, $SiO_4$, and $Si_3N_4$ is formed on a metal substrate 1-1 made of titanium (Ti), and a rear electrode 2 is formed on the insulating film 1-2.

Herein, the metal substrate 1-1 made of titanium has stable thermal and physical properties, whereby the properties are not changed even though the metal substrate 1-1 is heated and pressurized, and the weight of the solid state display can be reduced because the thickness can be reduced to 1 mm or less. In addition, the metal substrate 1-1 made of titanium material has a thermal expansive coefficient of $90~92\times10^{-7}$, which is similar to that of a dielectric material such as glass or glass-ceramics, thus reducing the heat distortion of the solid state display due to heat treatment.

Figure 6B:
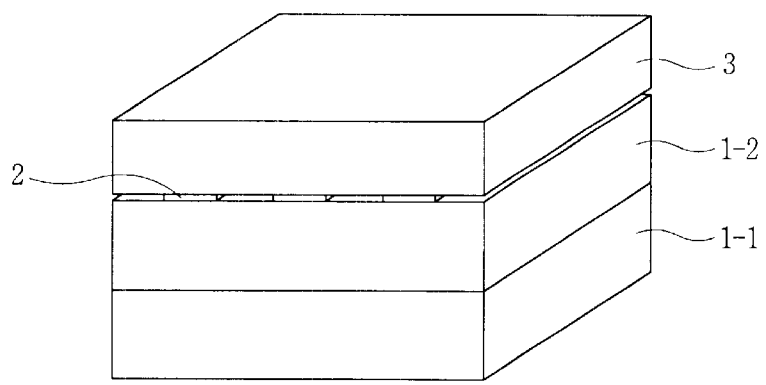
Figure 6C:
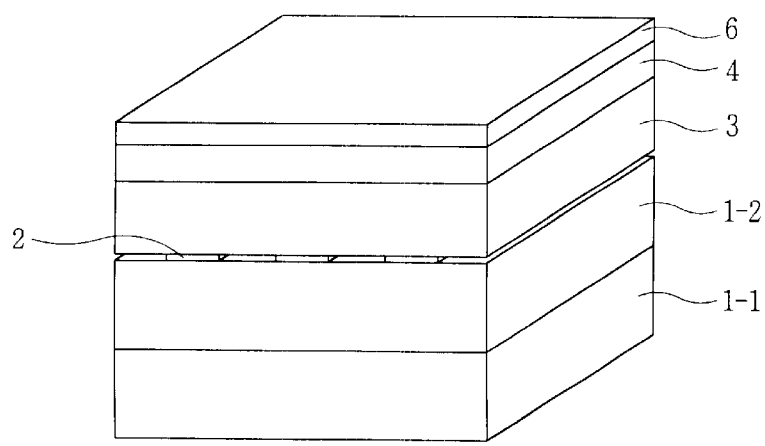

As illustrated in FIGS. 6B and 6C, dielectrics are applied on the metal substrate 1-1 on which the insulating film 1-2 and the rear electrode 2 are stacked, and then are baked, thus forming a thick dielectric layer 3 and forming a fluorescent layer 4 and a thin dielectric layer 6 on the thick dielectric layer 3.

Figure 6D:
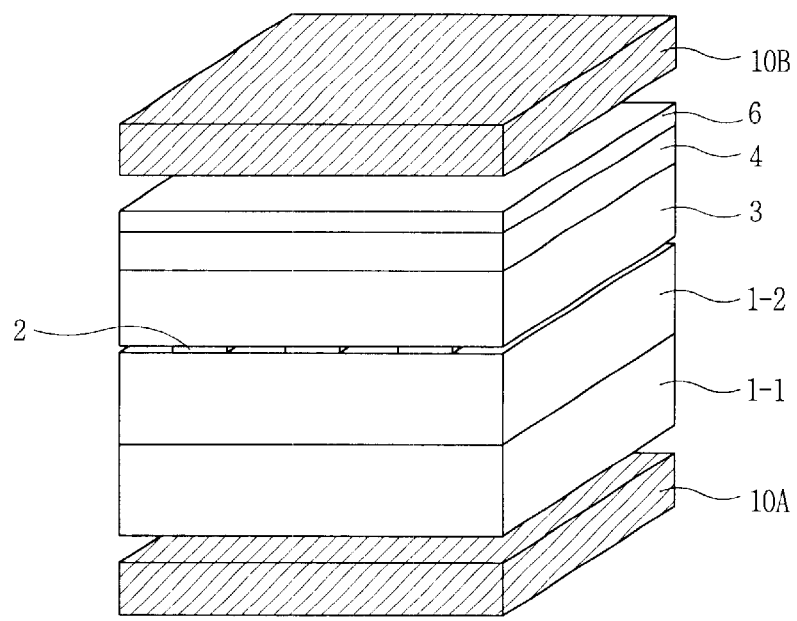
Figure 6E:
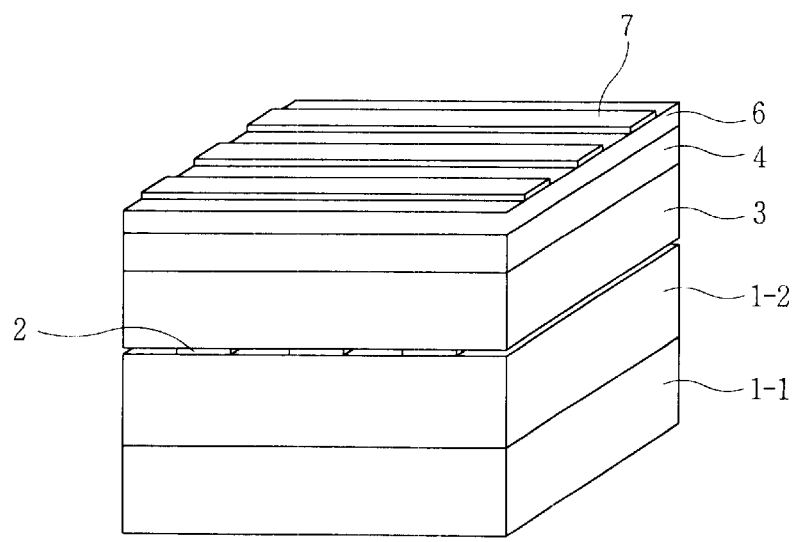

In the thusly stacked state, as illustrated in FIG. 6D, a pressure of about 100~200 kg/cm² is applied below the metal substrate 1-1 and above the thin dielectric layer 6 at a baking temperature of less than 600° C. using the brass plates 10A and 10B. Afterwards, as illustrated in FIG. 6E, the solid state display is fabricated by forming a transparent electrode on the thin dielectric layer 6.

Meanwhile, in the fabrication method in accordance with the embodiment as illustrated in FIG. 6, the above-described steps (b) through (e) can be replaced by the steps (b) and (e) as in the fabrication method of the embodiments as illustrated in FIGS. 4 and 5.

Meanwhile, the process in which the solid state display is stacked according to the method for fabricating a solid stated display in accordance with the present invention can be replaced by the process of the method for fabricating a solid state display in accordance with the present invention of FIGS. 4A through 4E or FIGS. 5A through 5E.

As seen from above, among the compositions of the thick dielectric layer in accordance with the present invention, the main glass has a transition point of less than 500° C. and a baking temperature of less than 700° C., so the rear substrate can be made of $Al_2O_3$ or glass, the heat distortion of the device and the deterioration of the device characteristics can be prevented, and accordingly the fabrication cost of the solid state display can be reduced. In addition, among the compositions of the thick dielectric layer in accordance with the present invention, the oxide filler has a high permittivity and dielectric property, whereby the solid state display has a low driving voltage and can be stably operated. In addition, when a paste powder mixture formed by mixing the main glass, oxide filler, and organic solvent is applied to the rear substrate and is baked, the occurrence of air bubbles is minimized for thereby preventing the dielectric breakdown of the fluorescent material.

In the method for fabricating a solid state display in accordance with the present invention, after the corresponding layers are stacked in order by using materials having a transition point of the main glass less than 500° C., heating and pressurization are possible, and the characteristic deterioration and physical deformation of each layer due to heat shocks can be minimized. In addition, in the method for fabricating a solid state display by heating and pressurization, the adherence of each layer is increased, so that the contamination due to the occurrence of pinholes of thick dielectrics and the penetration of impurities can be reduced, and the dielectric breakdown property and the life span of the device can be increased. In addition, in the method for fabricating a solid state display in accordance with the present invention, the weight of the solid state display can be reduced by using a metal substrate made of material such as titanium. In addition, in the method for fabricating a solid state display in the present invention, the layers constructing the solid state display are stacked and then are heated and pressurized, whereby the productivity is increased and accordingly the production costs are reduced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A dielectric composition for preventing the dielectric breakdown of a solid state display, comprising:
   a $P_2O_5$—ZnO—BaO glass; and
   an oxide filler comprising:
      a binary compound comprising $PbTiO_3$; or
      a ternary compound comprising $PbTiO_3$ and $PbZrO_3$.

2. The composition of claim 1, wherein the $P_2O_5$—ZnO—BaO glass has a transition point of less than 500° C. and a baking temperature of less than 700° C.

3. The composition of claim 1, wherein the $P_2O_5$—ZnO—BaO glass is mixed with 20~40% by weight of the oxide filler.

4. The composition of claim 1, wherein the $P_2O_5$—ZnO—BaO glass comprises 40~60% by weight of $P_2O_5$, 20~40% by weight of ZnO, 3~15% by weight of BaO, 2~10% by weight of $Li_2O$, 1~10% by weight of $B_2O_3$, 1~7% by weight of $Al_2O_3$, 1~16% by weight of CaO, 0~5% by weight of $K_2O$, and 0~5% by weight of $Na_2O$.

5. The composition of claim 1, wherein the oxide filler comprises the binary compound and the binary compound is $PbTiO_3+PbZrO_3$, $PbTiO_3+Pb(X_{1/3}Nb_{2/3})O_3$, $PbTiO_3+Pb(X_{1/2}Nb_{1/2})O_3$, $PbTiO_3+Pb(X_{1/2}W_{1/2})O_3$, $PbTiO_3+Pb(X_{1/2}Te_{1/2})O_3$, or $PbTiO_3+Pb(X_{1/3}Sb_{2/3})O_3$, wherein X comprises Mg, Co, Zn, Cd, Mn, Ni, Sb, or Y.

6. The composition of claim 1, wherein the oxide filler comprises the ternary compound and the ternary compound is $PbTiO_3+PbZRO_3+Pb(X_{1/3}Nb_{2/3})O_3$, $PbTiO_3+PbZrO_3+Pb(X_{1/2}Nb_{1/2})O_3$, $PbTiO_3+PbZrO_3+Pb(X_{1/2}W_{1/2})Pb(X_{1/2}Te_{1/2})O_3$, or $PbTiO_3+PbZrO_3+Pb(X_{1/3}Sb_{2/3})O_3$, wherein X comprises Mg, Co, Zn, Cd, Mn, Ni, Sb, or Y.

7. The composition of claim 1, wherein the dielectric composition has a permittivity of more than 1000 and a dielectric strength of more than $1.0\times10^6 V/m$.

* * * * *